United States Patent [19]

Carvajal

[11] Patent Number: 5,710,499
[45] Date of Patent: Jan. 20, 1998

[54] STEPPER MOTOR CONTROL CIRCUIT AND METHOD

[75] Inventor: Fernando D. Carvajal, McKinney, Tex.

[73] Assignee: Texas Instruments Incorporated, Dallas, Tex.

[21] Appl. No.: 315,647

[22] Filed: Sep. 30, 1994

[51] Int. Cl.$^6$ .................................................. H02P 8/00
[52] U.S. Cl. ....................... 318/696; 318/685; 310/49 R
[58] Field of Search ............................. 318/696, 685, 318/138, 439, 254; 310/49 R

[56] References Cited

U.S. PATENT DOCUMENTS 4,336,484  6/1982  Marinko ................................. 318/696
4,371,821  2/1983  Laesser et al. .

OTHER PUBLICATIONS

M-S Electronics Specifications and Application Notes, M-S Controller 312.003.

*Primary Examiner*—Karen Masih
*Attorney, Agent, or Firm*—Mark E. Courtney; W. James Brady III; Richard L. Donaldson

[57] ABSTRACT

A stepper control circuit and method for providing improved stepper motor control is provided. In a first embodiment, output drivers having three states are used to drive the coil terminals of an exemplary stepper motor. The use of the three state output drivers provides rapid discharge of the current stored in the coils of the motor, allowing faster operation of the stepper motor, and prevents erroneous skipping of steps, as occurred with prior art circuitry. A detailed implementation of the preferred embodiment is described. An integrated circuit including the stepper motor control circuitry of the first preferred embodiment is described.

Other devices, systems and methods are also disclosed.

19 Claims, 4 Drawing Sheets

STEPPING MOTOR STEP TRANSITIONS

| DEGREES | 0° | 60° | 120° | 180° | 240° | 300° |
|---|---|---|---|---|---|---|
| A | 1 | 1 | 0 | −1 | −1 | 0 |
| B | 1 | 0 | −1 | −1 | 0 | 1 |
| $A_1$ | 1 | 1 | Z | 0 | 0 | Z |
| $A_2$ | 0 | 0 | Z | 1 | 1 | Z |
| $B_1$ | 1 | Z | 0 | 0 | Z | 1 |
| $B_2$ | 0 | Z | 1 | 1 | Z | 0 |
| STATE | 0 | 1 | 2 | 3 | 4 | 5 |

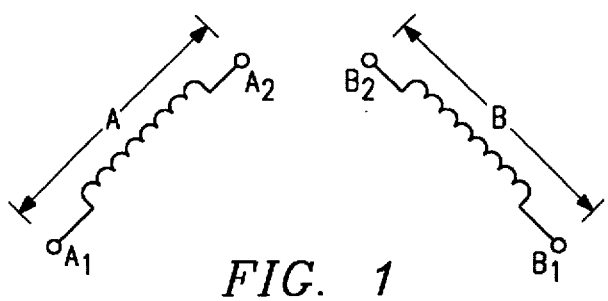
FIG. 1
(PRIOR ART)
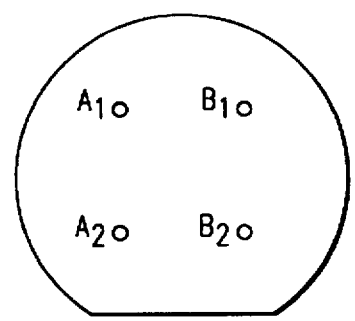
FIG. 2
(PRIOR ART)
STEPPING MOTOR STEP TRANSITIONS
| DEGREES | 0° | 60° | 120° | 180° | 240° | 300° |
|---------|----|----|------|------|------|------|
| A       | 1  | 1  | 0    | -1   | -1   | 0    |
| B       | 1  | 0  | -1   | -1   | 0    | 1    |
| $A_1$   | 1  | 1  | 0    | 0    | 0    | 0    |
| $A_2$   | 0  | 0  | 0    | 1    | 1    | 0    |
| $B_1$   | 1  | 0  | 0    | 0    | 0    | 1    |
| $B_2$   | 0  | 0  | 1    | 1    | 0    | 0    |
| STATE   | 0  | 1  | 2    | 3    | 4    | 5    |
FIG. 3
(PRIOR ART)
STEPPING MOTOR STEP TRANSITIONS
| DEGREES | 0° | 60° | 120° | 180° | 240° | 300° |
|---------|----|----|------|------|------|------|
| A       | 1  | 1  | 0    | -1   | -1   | 0    |
| B       | 1  | 0  | -1   | -1   | 0    | 1    |
| $A_1$   | 1  | 1  | Z    | 0    | 0    | Z    |
| $A_2$   | 0  | 0  | Z    | 1    | 1    | Z    |
| $B_1$   | 1  | Z  | 0    | 0    | Z    | 1    |
| $B_2$   | 0  | Z  | 1    | 1    | Z    | 0    |
| STATE   | 0  | 1  | 2    | 3    | 4    | 5    |
FIG. 4

STEPPING MOTOR STEP CONTROL CIRCUITRY

STEPPER MOTOR CONTROL CIRCUIT AND METHOD

FIELD OF THE INVENTION

This invention relates generally to motor control circuitry, and specifically to the application of digital circuitry for controlling stepper motors, and to integrated circuits and systems for controlling stepper motors.

BACKGROUND OF THE INVENTION

The background of the invention is best understood with reference to FIGS. 1 and 2. FIG. 1 depicts the coils of a typical prior art stepper motor which is designed to rotate in 60 degree steps. A typical motor of this sort is described by U.S. Pat. No. 4,371,821, entitled "Electromagnetic Motor Rotatable in Either Direction", issued Feb. 1, 1983 incorporated herein by reference. In this example, the motor has a rotor which is driven by two coils. The stepper motor can advance or retreat in 60 degree increments. In order to cause the motor to move through the steps, potentials are applied to coils A and B. Coil A has two terminals, A1 and A2. Likewise coil B has two terminals, B1 and B2. By applying potentials of positive voltage, negative voltage and zero voltage across coils A and B, the stepper motor is made to step through its range of motion. FIG. 2 depicts a symbol for the motor showing terminals A1, A2, B1 and B2 on the body of the motor.

FIG. 3 is a table showing the operation and required potentials to be applied to cots A and B to control the stepper motor of FIG. 2. For each position, or step, the coils must receive certain potentials. For this example, the motor moves in 60 degree increments, and therefore there are 6 possible positions, each 60 degrees from its neighbors. Each position is labeled with a state number from state 0 to state 5. The motor can move from a given state by continuing in the same direction another 60 degrees, or by retreating to the previous state by moving backwards 60 degrees. As an example, consider a single step motion. To move from the zero position to the 60 degree position, coils A and B must go from state 0; where both have positive potentials applied as indicated by the "1" in the A and B fields of state 0, to state 1, where the A coil has a positive potential applied and the B coil has a zero potential applied, as indicated by the 1 in the A field for state 1, and the zero in the B field in state 1.

Because the coils may have potentials of +1, 0 and −1 applied, the stepper motor control circuitry must control four terminals, two for each coil. For example, in state 2, the B coil receives a potential of −1 as indicated by the −1 in the B field for state 2. This means that the B1 terminal has a 0 value, and the B2 terminal as a +1 value, as seen from the table for B1 and B2 in state 2 in the figure. In other words, a negative potential is applied in this state. In contrast, consider state 0, where a positive potential is to be applied to coil B. This means that a +1 potential is applied to terminal B1, and a zero potential is applied to terminal B2.

When it is required for one of the two coils A and B to have a zero potential applied, for example in state 1 the B cofi is to have a zero potential applied, the prior art control methodology and circuitry drives both of the coil terminals to a high voltage, to ensure there is no potential in the coil. While this method is successful for low speed operation, it has several disadvantages. At the higher speeds now being designed for, the coil continues to have current in it, which cannot be discharged as both ends are being driven. This delays the movement of the rotor of the stepper motor until the coil is driven with a voltage in a subsequent step. The result is that the intended step is sometimes skipped. In this example, the rotor of the stepper motor, when used with the prior art control circuit, will begin to move in 90 degree increments, rather than the desired 60 degree increments. Also, the movement at the motor will appear to be rougher at higher speeds.

A need for an improved circuit and method for designing stepper motor control circuitry, which enhances high speed operation and uniform stepping action and operation, thus exists.

SUMMARY OF THE INVENTION

Generally, and in one form of the invention, an improved circuit and method for designing a stepper motor control circuit is provided using circuitry which has high impedance output states. When the control circuitry for a stepper motor is required to provide that no potential be applied to a coil, the terminal outputs to that coil are placed in a high impedance state. This allows the flux in the coil to rapidly decay away, so that the move to the next position can occur much faster. Also, because the current in the coil decays away, there are no erroneous skips of intended steps, resulting in uniform and smooth operation of the stepping motor. The method and circuitry is easily extended to the control of various stepping motors. The circuitry may be integrated onto an integrated circuit either as a single device or in combination with other circuitry.

BRIEF DESCRIPTION OF THE DRAWINGS

In the drawings:

FIG. 1 depicts the coils for an exemplary stepping motor;

FIG. 2 depicts a symbol for the stepping motor of FIG. 1, showing the four control terminals that must be driven to control the action of the stepping motor; of the stepping motor;

FIG. 3 depicts a transition table for stepping motor control circuitry of the prior art, showing the values used at the control terminals of FIG. 2;

FIG. 4 depicts a transition table for the stepping motor control circuitry of the invention, showing the use of the three state outputs to control the stepping motor;

Corresponding numerals and symbols in the different figures refer to corresponding parts unless otherwise indicated.

DETAILED DESCRIPTION OF PREFERRED EMBODIMENTS

In order to describe the operation and advantages of the invention, it will be described in relation to an exemplary stepping motor, the stepping motor previously described above in the background, and depicted in prior art drawings FIGS. 1 and 2. FIG. 3 depicts a prior art transition diagram of the stepping motor transitions, and the values required on the A and B coils to cause the motor to transition through these states. Again, terminals A1, A2, B1 and B2 must be driven to cause the required potentials to appear on coils A and B, thereby controlling the action of the motor.

In FIG. 4, the transition diagram of the prior art is modified and now uses high impedance output values, shown as "z" values on the diagram, in those states where a coil is required to have a zero potential. For example, in state 1, it is required that the B Coil have a zero potential across it. Terminals B1 and B2 are shown as having "z" values. This means that both ends of the coil are driven to a high impedance state. While in this state, the current stored in the coil from the previous state can quickly drain away.

Figure 5:
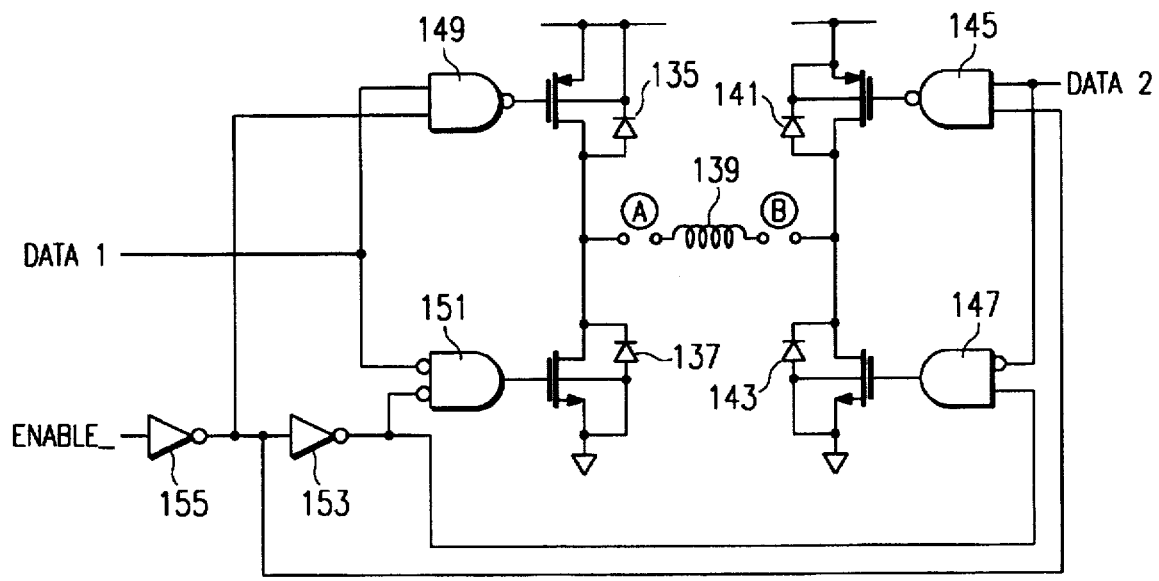
FIG. 5 depicts a pair of three state output drivers which provide part of the advantage of the invention driving a coil.

FIG. 5 depicts a pair of three state buffers coupled to one coil of the motor, to better illustrate the operation and advantages of the circuitry of the invention. Transistors 135 and 137 form a first CMOS output driver pair, for controlling the potential applied at one end of coil 139, labeled node A in FIG. 5. Transistors 141 and 147 form a second CMOS output driver for controlling the potential at the opposite end of coil 139, labeled node B: Logic gate 149 is a hand gate that asserts a low voltage at the gate terminal of transistor 135 when the three state enable input is at a low value and the data input DATA1 is also at a high logic level. Logic gate 151 is a inverted input "AND" gate that asserts a high value at the gate of transistor 137 when the three state enable input ENABLE_ is at a low value and the data input is a logic low. Thus, when the ENABLE_ input is a logic low, one of the two transistors 135 and 137 is necessarily enabled. When the incoming data DATA1 is a high logic level, transistor 135, the PMOS transistor, will be enabled and node A of the coil 139 will be pulled up to a high voltage level. When the incoming data is a low logic level, transistor 137, the NMOS transistor, will be enabled and node A of coil 139 will be coupled to the ground reference voltage and pulled down to a low voltage level. When the ENABLE_ input is a high logic level, inverters 153 and 155 are used to create signals to the logic gates 135 and 137, such that neither transistor 141 or 143 is enabled, leaving node A on coil 139 at an undetermined, or "z", potential.

Transistors 141 and 143 form the second CMOS output driver which controls the potential at the node labeled B and coupled to the other end of coil 139. These transistors are coupled the same as transistors 135 and 137 and operate in the same manner in response to the DATA2 input and the ENABLE_ input. Logic gates 145 and 147 are used to generate similar gate voltages on transistors 141 and 143 when the DATA2 input is high, and low, respectively. When the three state control input ENABLE_ is high, the inverters 155 and 153 set inputs to the logic gates 145 and 147 such that neither PMOS transistor 141 nor NMOS transistor 143 is enabled; that is node B on coil 139 is left at a "z" state.

FIG. 5 includes, for each transistor 135, 137, 141 and 143, the schematic representation of the parasitic diode between the body and the source terminals. These diodes are important to the operation of the invention, as will become clear as the operation is described.

First, the circuitry of FIG. 5 will be used to describe the operation of coil 139 as used in a prior art configuration, for contrast to the invention. In controlling a stepper motor, three voltage states are placed on the coil 139, as can be seen in the table of FIG. 3. A high potential from one end to the other, a zero potential, or a negative potential, are required on coil 139. A stepper motor may have one, two or any number of coils, but regardless of the distance between steps and the number of coils, these three states are required on a single coil.

In transitioning the motor from one state to another as shown in FIG. 3, it is necessary to decrease any current, or deflux, remaining in the coil 139 from the previous state. The discharge rate of a coil is governed by the well known current voltage relation for an inductor, that is:

$$I(t) = I_0 + \frac{1}{L} \int_0^t V(t) dt \tag{1}$$

Thus, it can be concluded that to decrease the time required to drive I to zero, it is desirable to increase the reverse voltage across the coil. Consider FIG. 5 in a prior art operation. Assume that initially, node B is at a high potential, and that node A is at a low potential, so that there is 5 volts on the coil. Transistor 141 is active, placing a high potential at node B, and transistor 141 is enabled, placing a ground potential at node B. In the next state, it is desired to have a zero current in the coil 139. In the prior art, this is accomplished by switching node B to a low potential, that is by disabling transistor 141 and enabling transistor 143. The coil 139 therefore initially has volts on it. The path for discharge current to flow is through transistor 137, into the ground plane, and current will continue to loop through the parasitic diode of transistor 143, so that the voltage around the loop, using Kirchoff's analysis method, is:

$$V_L + V_{MOS_{137}} + V_{diode_{143}} = 0 \tag{2}$$

Now, solving for $V_L$, the voltage on the inductor, gives:

$$-V_L = V_{mos_{137}} + V_{diode_{143}} \tag{3}$$

Since the MOS transistor 137 is on, and the drop across the diode is a Vbe drop, $V_L$ is approximately:

$$-V_L = 0.2V + 0.7V = 0.9V \tag{4}$$

The current in the cofi of the inductor at a given time is given by the exponential relationship:

$$I(t) = \frac{V}{R} * (1 - \exp^{-\frac{R}{L}}) \tag{5}$$

Thus, the time to deflux the coil to some low value is proportional to the reverse voltage across the inductor. Using the prior art operation as described above, $V_L$ is approximately 0.9V, as shown above. This gives a time to discharge of about 7t, where t is the time required to charge the coil. In fast motor stepping systems, the flux stored in the coil will not have sufficient time to discharge before the next state transition occurs, and erroneous steps and improper motor operation will result when the stepping speed is increased.

Now consider the operation of the circuitry of FIG. 5 using the three state, or added high impedance, output values. Again, assume that the coil 139 is at a potential where node B is at a high potential value, and transistor 141 is enabled to apply a high potential; and node A is at a low potential, and transistor 137 is enabled to couple node A to the ground reference. Now a transition is made where it is required that coil 139 have a zero flux in it. This is accomplished by placing both nodes A and B at the high impedance state, that is all four transistors 135, 137, 141 and 143 are disabled. Now, the discharge path for the flux stored in the coil is through the parasitic diode of transistor 135. Thus, it can be seen using the current-voltage relationship above that the time required to discharge the flux on the coil is now reduced, because the voltage around the loop has been increased. The voltage around the loop including the coil is now:

$$V_L + V_{diode_{135}} + V_{CC} + V_{diode_{143}} = 0 \quad (6)$$

Solving for $V_L$, and substituting the quantities for the various terms, yields:

$$-V_L = 0.7V + 5V + 0.7V = 6.4V \quad (7)$$

The invention therefore provides a voltage across the coil during discharge that is approximately seven times greater than the prior art, that is:

$$\frac{V_{L_{invention}}}{V_{L_{old}}} = \frac{6.4 \text{ V}}{.9 \text{ V}} = 7 \quad (8)$$

The advantage of the high impedance output drivers used in the invention is thus that the coil 139 can be rapidly defluxed between states; thereby resulting in correct operation of the coil, and proper stepping of the motor, even if the transitions from state to state are very rapid.

Figure 6:
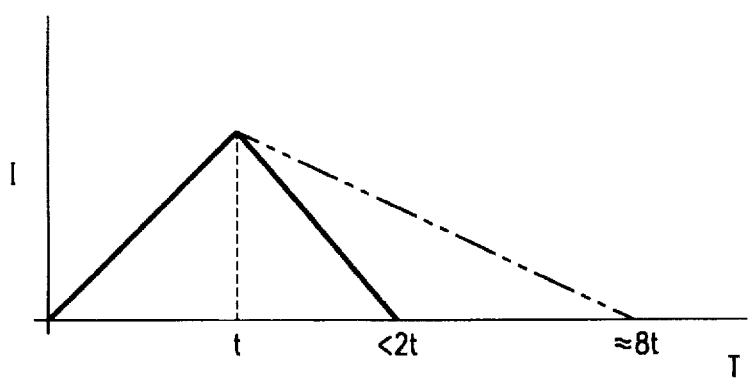
FIG. 6 is a current-voltage characteristic curve for a coil, showing the charge and discharge characteristic of a coil using the prior art stepper control circuitry and of a coil using the circuitry of the invention, to illustrate the advantage of the circuitry of the invention.

FIG. 6 further illustrates the advantages of the invention by showing the rate of charge for the coil, t; which is the same for the circuitry of the prior art and of the preferred embodiment. The dashed line illustrates the rate of deflux using the prior art technique, approximately 7t from the time the discharge starts, so that it is complete at time 8t, and the solid downward line indicates the rate of discharge achieved using the three state output drivers of FIG. 5, approximately 2t, that is the time to deflux the coil is approximately the same time as that needed to charge the coil.

Figure 7:
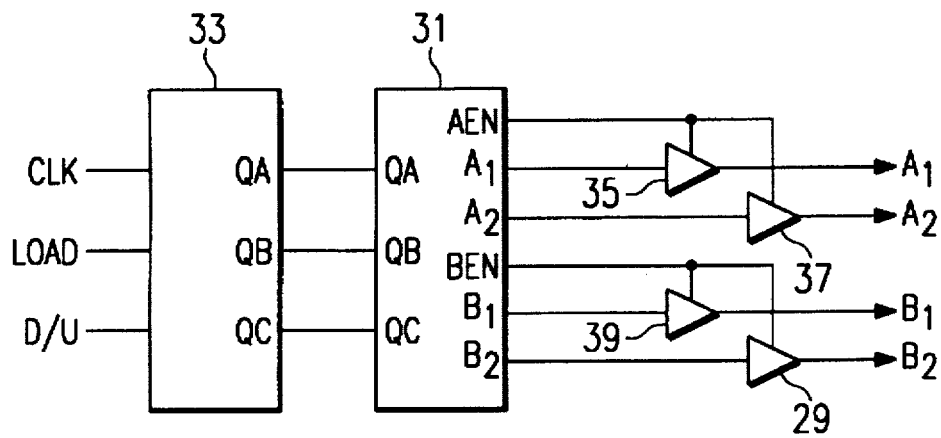
FIG. 7 depicts a block diagram of a first embodiment of a circuit to output the values in the transition table of FIG. 4 to control a stepping motor.

FIG. 7 depicts a block diagram of a circuit which implements the transition diagram of FIG. 4 and outputs the signals A1, A2 and B1, B2 to the coils of the stepper motor. Block 31 is a logic decode circuit which outputs six output signals: an enable signal to the A output drivers 35 and 37 labeled AEN in the figure, an output signal A1 and an output signal A2, an enable signal to the B output drivers labeled BEN in the figure, an output signal B1 and an output signal B2. The AEN signal is coupled to the output enable control of three state buffers 35 and 37. The A2 signal is coupled to the input of buffer 35. The A2 signal is coupled to the input of buffer 37. Buffers 35 and 37 output signals A1 and A2, respectively. Similarly, the BEN signal is coupled to the output enable control of three state buffers 39 and 29. The input to buffer 39 is the B1 output of block 31. The input of buffer 29 is the B2 output of block 31. The outputs of buffers 39 and 29 are coupled to the B1 and B2 outputs, respectively. Block 33 is an up/down counter which is used to implement the states 0–5 of FIG. 4 as a state machine. The state outputs QA, QB and QC are connected to the logic decode circuit 31 and are used to create the outputs to the three state buffers 35, 37, 39 and 29. The up/down counter 33 receives a direction input on the up/down input labeled D/U, a clock input on the signal labeled CLK, and a reset/load signal on the input labeled LOAD. The output buffers 35 and 37 may be composed of a CMOS output driver and logic circuitry as shown in FIG. 5, or of other three state output circuits, so long as when the output driver is at a high impedance, there is a rapid discharge path available to discharge the coil of the stepper motor. For example, BiCMOS or bipolar circuits could be used as alternatives to the CMOS output buffers shown in FIG. 5, also gallium arsenide and other semiconductor technologies could be used and are contemplated herein as alternative embodiments of the invention.

In operation, the up/down counter is initialized by the LOAD signal to be at state 0. In state 0, the decoder block decodes the A1, A2, B1 and B2 outputs as shown in FIG. 4, so that both coil A and B are in the "1" voltage state. From state 0, the counter can be clocked to move up to state 1 or down to state 5, depending on the direction input D/U. Assuming the motor is to advance, the D/U input will be in the "up" state, and the state will transition to state 1 on the next transition of the CLK input.

In state 1, the B1 and B2 outputs are to be placed in a high impedance mode, so the decoder will cause a "1" to be output on the BEN output. The A1 output is to be a 1, so the decoder 31 will likewise cause a 1 to be output on the A1 output. The A2 output is simply inverted from the A1 output, similarly the B2 output is also the simple inversion of the A1 output. The other states of the transition diagram are similarly decoded to drive the output signals to match the transition diagram of FIG. 4.

Figure 8:
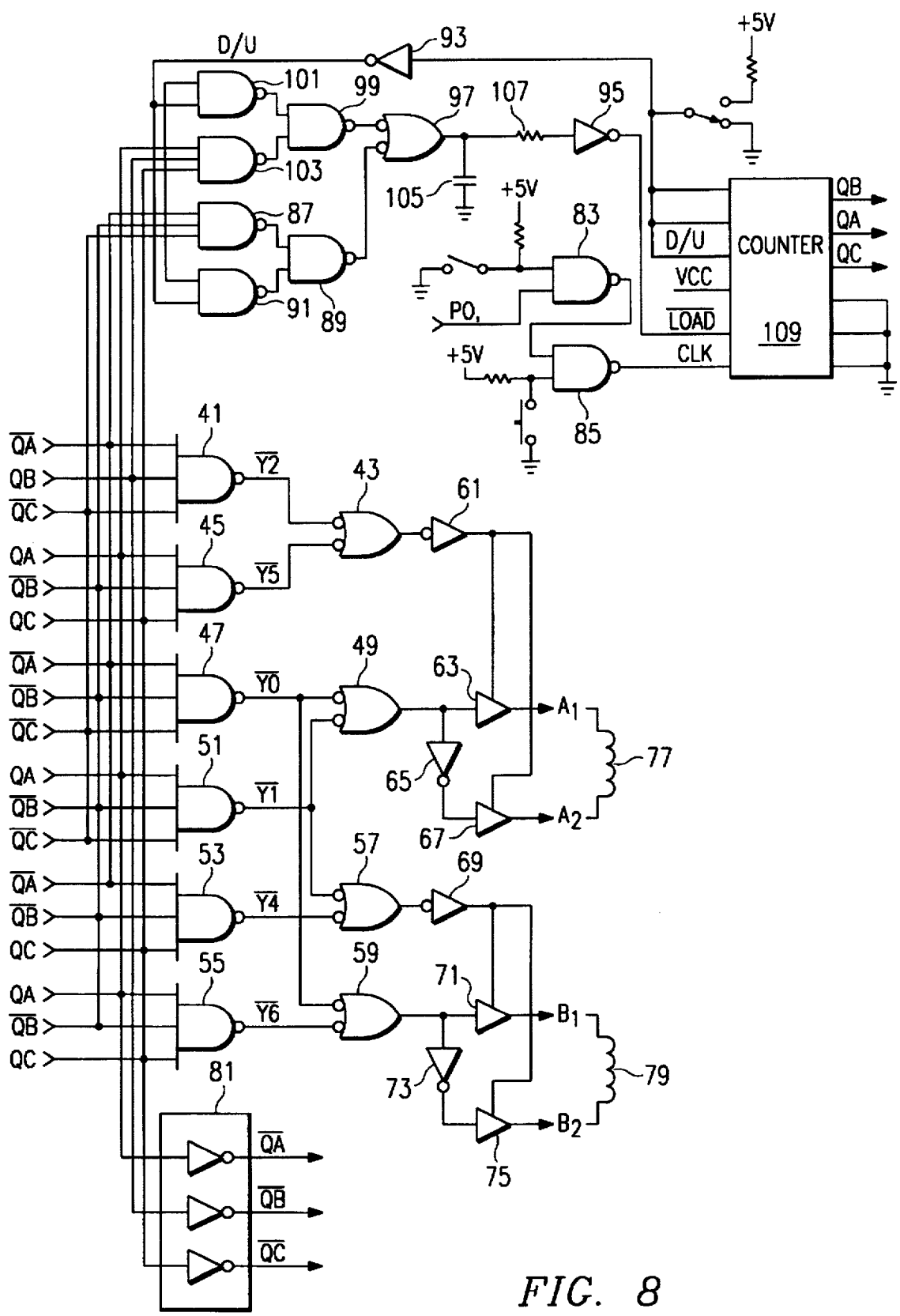
FIG. 8 depicts a circuit diagram of a detailed implementation of the first preferred embodiment of FIG. 7.

FIG. 8 depicts circuitry which is a first preferred embodiment of a circuit to implement the block diagram of FIG. 7. Again, the circuitry has outputs A1, A2, B1 and B2. The logic decode block 31 of FIG. 7 is implemented by gates 41, 43, 45, 47, 49, 51, 53, 55, 57, 59, 61, 65, 69 and 73 of FIG. 8. Up/down counter 109, load circuitry formed by gates 87, 89, 91, 93, 95, 97, 99, 101, 103; and resistors 107 and capacitors 105 form the circuitry of state machine 33 of FIG. 7. Gates 83 and 85 enable a pushbutton switch 84 to generate the clock input labeled CLK. Inverters 81 make the decode of state variables QA, QB and QC easier.

Outputs A1 and B1 are created using sum of products form to reduce the state transitions in FIG. 4 to logic gates, and outputs A2 and B2 are created by inverting outputs A1 and B1 using gates 65 and 73. This is possible because the transition diagram of FIG. 4 shows that unless the A1 and A2 outputs are placed in a high impedance, they are always opposites. Likewise, the B1 and B2 outputs are always opposite unless in high impedance mode. The transition diagram of FIG. 4 indicates that 6 states are needed. Thus, the circuitry of FIG. 8 requires 3 state variables, QA, QB and QC. The operation of logic gates 41, 43, 45, 47, 49, 51, 61 and 65 is now easily understood. In states 2 and 5 in the transition table of FIG. 4, output signals A1 and A2 are required to be in high impedance condition. The three state enable lines of the output buffers 63 and 67 are driven by the output of inverter 61, which has at its input the logic OR output of gate 43, which is the OR of the output of NAND gate 41, which detects state 2 and state 5, that is 010, which is detected by NAND gate 45. Whenever either state occurs, the A2 and A1 outputs will be placed in a high impedance mode, and thus no potential will be applied to coil A.

Similarly, the input to buffer 63, which drives the A1 signal, is a logic one value in states 0 and 1, as can be seen from the diagram of FIG. 4. Thus, logic gates 49, 47, and 51 form a logical OR at the input to buffer 63. The A2 signal is decoded easily by inverting this signal using inverter 65 and feeding it to the input to buffer 67. NAND gate 47 detects state 0, and NAND gate 51 detects when the state machine is in state 1. The OR gate 49 then combines these terms.

The three state buffer enables for signals B1 and B2 are similarly decoded from the state variables QA, QB and QC. Logic gates 57, 51, 53 and 69 detect when the state machine is in states 1 and 4. In these states, inverter 69 outputs a logic zero, and the buffers 71 and 75 drive high impedance values on outputs B1 and B2, thus there is no potential across coil B. Similarly, in states 0 and 4, it can be seen from FIG. 4 that the B1 output should be a logic one. The input to buffer 71 is then driven by OR gate 59, which receives the output of NAND gate 47 detecting state 0, and NAND gate 53 detecting state 4. As for the B2 output, the input to buffer 75, which drives the B2 output, is easily decoded by inverting the input to buffer 73, which drives the B1 output.

Since the stepper motor transition diagram indicates that the state transition is always to an adjacent state, and because the state transition can be to a higher or lower state, it is convenient to use an up-down counter as the next state generating device. In FIG. 8, a Texas Instruments binary up-down counter, numbered LS '191, is shown. Any other readily available up-down counter may be used as well. Other alternatives include a synchronous state machine combined with combinational logic, a sequential state machine, a PLA implementation, all given only as examples. Only three state variables are required for this example. The counter begins in state zero. When the state transition is from state 5 to state 6, the counter must be re-initialized to state 0, since there is no state 6 in the transition diagram of FIG. 4. Similarly, when the transition is from state 0 down to state 5, the counter must be loaded with a value of five. This is done by decoding the state variables and creating a forced load signal. Logic gates 87, 89, 91, 93, 97, 95, 105, 107, 99, 101, and 103 in FIG. 6 accomplish this. NAND gate 87 detects a state of 6, and NAND gate 101 detects a state of 7. These outputs are combined with a gate that detects a clock edge and the correct value on the D/U signal, and forces a zero on the LOAD_ signal when either event occurs. Input signal D/U controls the up/down control line, so that the motor may advance or retreat on a given transition. The up/down counter has data inputs which are used when the LOAD_ signal is active to preset the counter to a desired position, either zero or five depending on the direction of the transition.

A clock control circuit is provided by the latch formed from NAND gates 83 and 85 and the push button switch 84. In this embodiment, the CLK signal is driven when the user manually pushes the switch 84. It should be understood that although FIG. 8 depicts the clock and up/down control lines as being driven by manual switches, this is only done for convenience of illustration. In most typical applications these inputs will be driven by other circuitry, integrated circuits, processors, etc. The circuitry of FIG. 8 can receive these input signals and autonomously control the action of a stepper motor.

Figure 9:
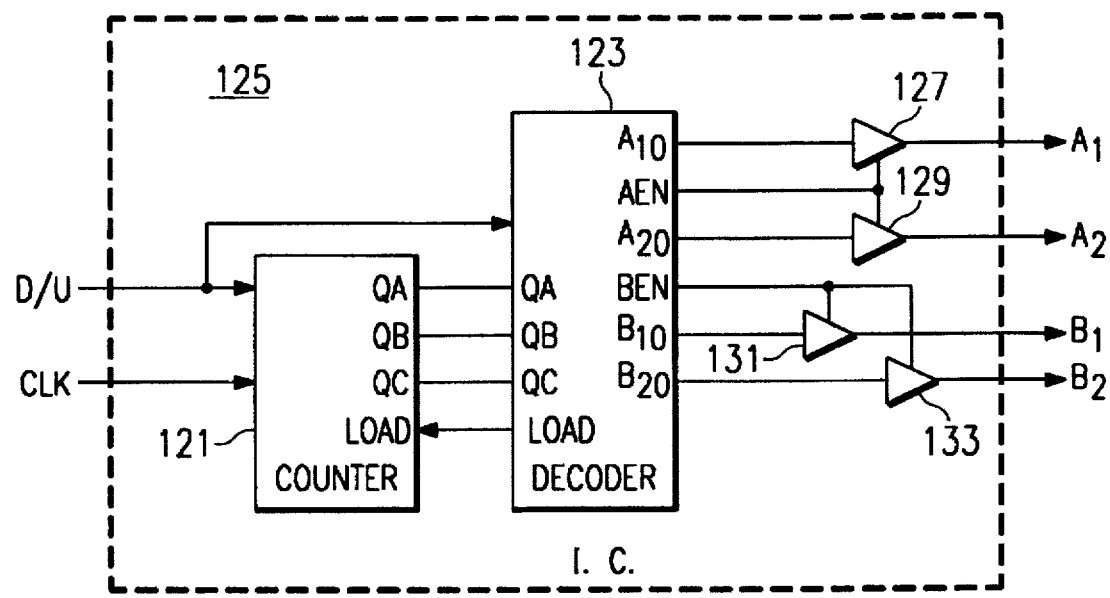
FIG. 9 depicts an integrated circuit comprising the circuitry of FIG. 6 and including additional circuitry as required by the application to form an integrated stepper control circuit.

FIG. 9 depicts an integrated circuit including the circuitry of FIG. 8 and having three state or high impedance outputs for controlling a stepper motor. The circuitry of FIG. 8 is included in the blocks of FIG. 9. The logic decoding section 123 includes the logic gates 41, 43, 45, 47, 49, 51, 53, 55, 57, 59, 61, 65, 69, 73, 81, for decoding AEN, BEN, A1, A2, B1 and B2 outputs. Logic decoding section 123 also includes the gates 87, 89, 91, 93, 95, 97 99, 101, and 103 for decoding the LOAD signal. State machine 121 includes the '191 counter 109 of FIG. 8 and the clock generator gates 83 and 85. Buffers 127, 129, 131, and 133 are shown driving outputs A1, A2 and B1, B2. In operation, the outputs of the integrated circuit of FIG. 9 match the values for terminals A1, A2, and B1, B2 for the transition diagram of FIG. 4. By placing the circuitry of FIG. 8 onto an integrated circuit, additional functions used for the application can also be included to improve the overall area required for the system and to reduce power usage. The integrated circuit of FIG. 9 can be implemented in any semiconductor technology, such as CMOS, bipolar, BiCMOS, SOS, SOI, and gallium arsenide, for example. Well known design techniques can be used to design, simulate, verify, and layout the integrated circuit of FIG. 9. ASIC, gate array, and field programmable technology can be used to implement this circuit, as well as other alternatives that will be apparent to one skilled in the art. All of these alternatives are contemplated by this application and the claims below.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A stepper motor control circuit, comprising:
   output driver circuitry for driving the coils of a motor to predetermined potentials, responsive to control signals; and
   logic decode circuitry coupled to one or more direction inputs, and outputting control signals to said output driver circuitry to cause the output driver circuitry to drive the coils of the stepper motor to predetermined potentials in a particular sequence so that the stepper motor moves in predetermined steps;
   wherein said output driver circuitry selectively drives the coils of said stepper motor to a high impedance state, the output driver circuitry further providing a fast flux discharge path while said coils are in said high impedance state.

2. The stepper motor control circuitry of claim 1, wherein said output driver circuitry comprises:
   a pair of CMOS output drivers associated with each coil of said stepper motor, each CMOS output driver of said pair being coupled to one end of the associated coil, each CMOS output driver selectively outputting a logic high voltage, a logic low voltage, and a high impedance responsive to said control signals.

3. The stepper motor control circuitry of claim 1 wherein said output driver circuitry comprises:
   a pair of three state buffers associated with each coil of the stepper motor, each of said three state buffers selectively outputting a logic high voltage, a logic low voltage, and a high impedance responsive to said control signals.

4. The stepper motor control circuitry of claim 3, wherein said pair of three state buffers each comprise:
   a first MOS transistor having its conductive path coupled between a positive reference voltage and an output node, and having a gate input;
   a second MOS transistor having its conductive path coupled between said output node and a ground reference voltage, and having a gate input; and
   logic circuitry coupled to the gate inputs of said first and second MOS transistors such that the output node is selectively coupled through said first MOS transistor to said positive reference voltage responsive to a first state of a data input, said output node being coupled to said ground reference voltage through said second transistor responsive to a second state of said data input, and said output node is at a high impedance responsive to a control input.

5. The stepper motor control circuitry of claim 1 wherein said output driver circuitry comprises:
   a pair of BiCMOS output drivers coupled to each coil of the stepper motor, each BiCMOS output driver selectively outputting a high logic value, a low logic value, and a high impedance responsive to said control signals.

6. The stepper motor control circuitry of claim 2, wherein the CMOS output drivers each comprise MOS transistors having a parasitic diode between the source and drain terminals that is forward biased while said transistor is disabled, so that when the output drivers are in the high impedance state the parasitic diodes provide a path to rapidly remove current from the coils of the stepper motor.

7. The stepper motor control circuitry of claim 1, wherein said logic decode circuitry comprises a state machine.

8. An integrated circuit for controlling a stepper motor, comprising:

input terminals for receiving at least a directional control input;

output terminals for driving coils of the stepper motor for controlling the direction and stepping action of said stepper motor;

output circuitry coupled to said output terminals for selectively outputting predetermined potentials to said coils of said stepper motor responsive to control signals, said predetermined potentials including a high impedance state; and control circuitry coupled to said input terminals and outputting said control signals to said output circuitry, said control circuitry causing said output circuitry to drive the coils of said stepper motor to predetermined potentials in a predetermined sequence, responsive to said directional control input;

wherein said output circuitry provides a path to rapidly discharge flux from the coils of said stepper motor when said output circuitry is in said high impedance state.

9. The integrated circuit of claim 8, wherein said output circuitry comprises:

a pair of three state buffers associated with each coil of the stepper motor, each of said three state buffers selectively outputting a logic high voltage, a logic low voltage, and a high impedance responsive to said control signals.

10. The integrated circuit of claim 8, wherein said output circuitry comprises:

a pair of CMOS output drivers associated with each coil of said stepper motor, each CMOS output driver of said pair being coupled to said output terminals for driving one end of the associated coil, each CMOS output driver selectively outputting a logic high voltage, a logic low voltage, and a high impedance responsive to said control signals.

11. The integrated circuit of claim 9, wherein said pair of three state buffers each comprise:

a first MOS transistor having its conductive path coupled between a positive reference voltage and an output node, and having a gate input;

a second MOS transistor having its conductive path coupled between said output node and a ground reference voltage, and having a gate input; and logic circuitry coupled to the gate inputs of said first and second MOS transistors such that the output node is selectively coupled through said first MOS transistor to said positive reference voltage responsive to a first state of a data input, said output node being coupled to said ground reference voltage through said second transistor responsive to a second state of said data input, and said output node is at a high impedance responsive to a control input.

12. The integrated circuit of claim 8, wherein said output circuitry comprises:

a pair of BiCMOS output drivers coupled the output terminals of the integrated circuit for outputting a voltage to each coil of the stepper motor, each BiCMOS output driver selectively outputting a high logic value, a low logic value, and a high impedance responsive to said control signals.

13. The integrated circuit of claim 10, wherein the CMOS output drivers each comprise MOS transistors having a parasitic diode between the source and drain terminals that is forward biased while said transistor is disabled, so that when the output drivers are in the high impedance state the parasitic diodes provide a path to rapidly remove current from the coils of the stepper motor.

14. The integrated circuit of claim 8, wherein said control circuitry comprises a state machine and combinational logic circuitry.

15. A method for providing improved stepper motor control, comprising the steps of:

selectively outputting predetermined potentials to an associated coil responsive to a control signal, the predetermined potentials including a high impedance; and outputting said predetermined potentials to said coil to control the stepping action of the stepper motor responsive to a direction input.

16. The method of claim 15, wherein said step of selectively outputting predetermined potentials comprises:

coupling a pair of three state buffers to each coil of said stepper motor, each of said three state buffers selectively outputting a logic high voltage, a logic low voltage, and a high impedance responsive to said direction input signals.

17. The method of claim 16, wherein said step of selectively outputting predetermined potentials further comprises the steps of:

coupling a pair of CMOS output drivers to each coil of said stepper motor, each CMOS output driver being driving one end of the associated coil, each CMOS output driver selectively outputting a logic high voltage, a logic low voltage, and a high impedance responsive to said direction input signal.

18. The method of claim 17, wherein said step of providing said pair of CMOS drivers further comprises:

forward biasing a parasitic diode within said pair of CMOS output drivers when the CMOS output drivers are outputting said high impedance, the associated coil of said stepper motor being rapidly discharged by the parasitic diode.

19. A method for providing an improved stepper motor control circuit, comprising:

selectively outputting a high impedance to the coils of the stepper motor when it is desirable to place the coils at a zero potential, the output circuitry rapidly discharging the coils when the output circuitry is outputting the high impedance; and placing said potentials on the coils of the stepper motor in a predetermined sequence, thereby controlling the direction and stepping action of the stepper motor.

* * * * *